United States Patent [19]

Cengel et al.

[11] 4,379,064

[45] Apr. 5, 1983

[54] OXIDATIVE PASSIVATION OF POLYAMINE-DISPERSANTS

[75] Inventors: John A. Cengel, Wheaton; Mark W. Hunt, Naperville; Joseph S. Strukl, Lisle; Peter G. Pappas, Downers Grove, all of Ill.

[73] Assignee: Standard Oil Company (Indiana), Chicago, Ill.

[21] Appl. No.: 246,007

[22] Filed: Mar. 20, 1981

[51] Int. Cl.$^3$ .................. C10M 1/32; C10M 3/26; C10M 1/20
[52] U.S. Cl. ..................... 252/51.5 A; 252/51.5 R
[58] Field of Search .................... 252/51.5 A

[56] References Cited

U.S. PATENT DOCUMENTS

| | | | |
|---|---|---|---|
| 3,219,666 | 11/1965 | Norman et al. | 252/51.5 A X |
| 3,442,808 | 5/1969 | Traise et al. | 252/51.5 A X |
| 3,452,002 | 6/1969 | Brasch | 252/51.5 A X |
| 4,142,980 | 3/1979 | Karll et al. | 252/51.5 A |
| 4,170,562 | 10/1979 | West | 252/51.5 A |
| 4,199,462 | 4/1980 | Soula et al. | 252/51.5 A |

*Primary Examiner*—Paul F. Shaver
*Attorney, Agent, or Firm*—Richard A. Kretchmer; William T. McClain; William H. Magidson

[57] ABSTRACT

Mild oxidation of polyamine crankcase dispersants passivates basically reacting polyamine dispersants to fluorocarbon compositions used in engines.

11 Claims, No Drawings

OXIDATIVE PASSIVATION OF POLYAMINE-DISPERSANTS

This invention relates to lubricating oil crankcase compositions, concentrates, thereof and methods for improving the operation of internal combustion engines, by reducing the tendency of polyamine-dispersant compositions to attack fluorohydrocarbon-type engine seals. More particularly, the invention comprises a lubricating oil composition which may be used in engines to prevent discoloration and decomposition of fluorocarbon engine seals.

Fluorocarbon compositions are commonly used in forming flexible engine seals used in assembling internal combustion engines. The seals are used to prevent leakage of lubricants at the point where moving parts such as crankshafts leave the engine. Any substantial leak of lubricant from internal combustion engine crankcases is undesirable.

We have discovered that engine seals prepared from fluorocarbon compositions are subject to mechanical deterioration, dimensional deterioration, discoloration, crazing, and swelling when used in engines containing lubricating oils having polyamine dispersants. The polyamine-containing dispersants interact with the fluorocarbon seals altering the underlying polymeric structure causing the seal composition to absorb oil. As the oil content of the seal increases, the mechanical strength and dimensional integrity of the seal deteriorates until the seal fails to adequately prevent leakage of lubricant from crankcases.

Clearly, a need exists to provide a highly effective polyamine dispersant which provides dispersancy to the oil while at the same time not causing the deterioration of fluorocarbon engine seals and the associated leak of lubricant.

The primarily object of this invention is to prevent the deterioration of fluorocarbon engine seals in the presence of polyamine dispersants. Another object of this invention is to prevent leakage of lubricant from crankcases. A further object of the invention is to provide an improved polyamine dispersant having adequate dispersancy and substantially no affect on fluorocarbon engine seals. A further object of the invention is to passivate polyamine-containing dispersants to fluorocarbon compositions. These and other objects of the invention will be found in the discussion and examples below.

We have found that polyamine dispersants can be passivated to fluorocarbon compositions by the controlled oxidation of the polyamine dispersant. We have found that the controlled oxidation of the polyamine dispersant, such that the molecular weight of the dispersant composition or the polyamine substituent is not substantially degraded, produces the passivation affect. The mildly oxidized polyamine moieties no longer cause any substantial deterioration of fluorocarbon seals.

Those skilled in the art have long recognized that oxidation of polyamine dispersants reduces dispersancy. The highly-polar polyamine moiety, in combination with the non-polar, oil soluble moiety of the dispersant, combines with deposit precursors to prevent formation of sludge and varnish. Any deterioration or degradation of the polyamine structure or hydrocarbon oil soluble moiety reduces the ability of polyamine additive to suspend sludge and varnish precursors. Accordingly, the oxidation of polyamine dispersants has been avoided in processes for the preparation of polyamine dispersants.

U.S. Pat. Nos. 2,806,860; 3,316,177; 4,098,585; and 4,203,730 and others each teach the oxidation or epoxidation of polymeric oil-soluble hydrocarbon carboxylic acid compounds prior to the reaction of the carboxylic acid moiety with a polyamine compound to form a dispersant. These compositions suffer from the disadvantage that the polyamine moiety remains highly basic and potentially destructive to fluorocarbon seals. Briefly the improved dispersants of this invention comprise the reaction of a polyamine dispersant and an oxidizing agent.

Oxidizing agents which can be used to mildly oxidize the polyamine moiety of the polyamine dispersants of this invention are conventional oxidizing agents capable of releasing atomic or molecular oxygen under oxidizing conditions. Examples of oxidizing agents which can be used under suitable conditions of temperature, concentration and pressure, without substantial degradation of the polyamine or the molecular weight of the dispersant composition, include oxygen, oxygen containing gases, air, sulfur oxides such as sulfur dioxide, sulfur trioxide, etc., nitrogen oxides including nitrogen dioxide, nitrogen trioxide, nitrogen pentoxide, etc., peroxides such as hydrogen peroxide, sodium peroxide, percarboxylic acids such as perbenzoic acid and ozone. Other suitable oxidizing agents are the oxygen-containing gases such as various mixtures of oxygen, air, inert gases such as carbon dioxide, noble gases such as argon, helium, etc., nitrogen, natural gas, etc. Air, air with added oxygen or air diluted with inert gases or with a portion of the oxygen removed, resulting in a reduced oxygen concentration, are preferred agents for the oxidation of the polyamine moieties for reasons of economy, availability and safety.

Oil-dispersible polyamine dispersants which can be mildly oxidized in the present invention to prevent fluorocarbon seal attack include an oil-solubilizing group containing at least about 40 carbon atoms directly or indirectly bonded to the polar polyamine group. The dispersant may contain more than one of either of such groups per molecule, as will be apparent from the description hereinafter.

Many dispersants of this type are known in the art and are described in various patents. Any of such dispersants are suitable for use in preparing the compositions and performing methods of this invention. The following are illustrative:

(1) Reaction products of a monocarboxylic acid, a dicarboxylic acid, a polycarboxylic acid, etc. (or derivatives thereof) with nitrogen-containing compounds, such as amines, hereinafter referred to herein as carboxylic polyamine dispersants, are described in many patents, including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |

-continued

| | | |
|---|---|---|
| 3,346,493 | 3,522,179 | Gr 1,306,529 | which are incorporated by reference herein.

(2) Reaction products of aliphatic or alicyclic halides containing at least about 40 carbon atoms with amines, preferably polyalkylene polyamines which are hereinafter characterized as alkyl polyamine dispersants and examples thereof are described, for example, in the following U.S. Patents:

| | |
|---|---|
| 3,275,554 | 3,454,555 |
| 3,438,757 | 3,565,804 | which are incorporated by reference herein.

(3) Reaction products of an alkyl phenol or an oxidized olefinic polymer, wherein the alkyl group is oil soluble, with aliphatic aldehydes containing 1–7 carbon atoms (especially formaldehyde and derivatives thereof) and amines (especially alkylene polyamines), characterized as Mannich polyamine dispersants are described in the following U.S. Patents are illustrative:

| | | |
|---|---|---|
| 2,459,112 | 3,442,808 | 3,591,598 |
| 2,962,442 | 3,448,047 | 3,600,372 |
| 2,984,550 | 3,454,497 | 3,634,515 |
| 3,036,003 | 3,459,661 | 3,649,229 |
| 3,166,516 | 3,493,520 | 3,752,277 |
| 3,236,770 | 3,539,633 | 3,725,480 |
| 3,355,270 | 3,544,470 | 3,726,882 |
| 3,368,972 | 3,558,743 | 3,872,019 |
| 3,413,347 | 3,586,629 | 3,980,569 |
| 3,461,172 | 3,697,574 | 4,011,380 | which are incorporated by reference herein.

(4) Polymers containing an oil-solubilizing group (e.g., a pendant alkyl group having at least about 8 carbon atoms) and a polar group, for example interpolymers of decyl methacrylate, vinyl decyl ether or a relatively high molecular weight olefin with aminoalkyl acrylates, aminoalkyl acrylamides or poly(oxyalkylene)-substituted alkyl acrylates, as well as copolymers of styrene, alkyl maleates and maleic acid amides or imides, are referred to hereinafter as polymeric polyamine dispersants and examples thereof are disclosed in the following U.S. Patents:

| | |
|---|---|
| 3,329,658 | 3,666,730 |
| 3,449,250 | 3,687,849 |
| 3,519,565 | 3,702,300 | which are incorporated by reference herein.

(5) Products obtained by post-treating the carboxylic polyamide, alkyl polyamine, Mannich polyamine or polymeric polyamine dispersants with such reagents as urea, thiourea, carbon disulfide, aldehydes, ketones, carboxylic acids, hydrocarbon-substituted succinic anhydrides, nitriles, epoxides, boron compounds, phosphorous compounds or the like. Exemplary materials of this kind are described in German published application (OLS) 2,551,256 and in the following U.S. Patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 | which are incorporated by reference herein.

The carboxylic-polyamine and Mannich-polyamine dispersants are preferred dispersants for mild oxidation for reason of economy and high dispersancy.

The carboxylic polyamine dispersants, which will be described first, are those disclosed (for example) in the above-mentioned U.S. Pat. Nos. 3,219,666 and 3,272,746 which also describe a large number of methods for their preparation. The polyamine group therein is derived from compounds characterized by a radical of the structure:

$$-\overset{|}{N}H$$

wherein the two remaining valences of nitrogen are satisfied by hydrogen, amino or organic radicals bonded to said nitrogen atom through direct carbon-to-nitrogen linkages. These compounds include aliphatic, aromatic, heterocyclic and carbocyclic amines.

Polyamines are preferred for preparing the carboxylic polyamine dispersant. Among the polyamines are alkylene polyamines (and mixtures thereof) including those having the formula

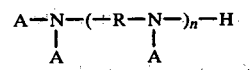

$$A-\underset{A}{\overset{|}{N}}-(-R-\underset{A}{\overset{|}{N}}-)_n-H$$

wherein n is an integer between 1 and about 10, preferably between 2 and 8; each A can be independently hydrogen or a hydrocarbon or hydroxy-substituted hydrocarbon radical which can be derived from an alkylene oxide compound, having up to about 30 atoms; and R is a divalent hydrocarbon radical having from about 1 to about 18 carbons. A can be an aliphatic radical of up to about 10 carbon atoms which may be substituted with one or two hydroxy groups, and R is a lower alkylene radical having 1–10, preferably 2–6, carbon atoms. Preferred polyamines are the alkylene polyamines wherein each A is hydrogen. Such alkylene polyamines include methylene polyamines, ethylene polyamines, butylene polyamines, propylene polyamines, pentylene polyamines, hexylene polyamines and heptylene polyamines. The higher homologs of such amines and related aminoalkyl-substituted piperazines are also included. Specific examples of such polyamines include ethylene diamine, triethylene tetramine, tris(2-aminoethyl)amine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)-imidazoline, 1,3-bis-(2-aminoethyl)imidazoline, 1-(2-aminopropyl)-piperazine, 1,4-bis(2-aminoethyl)-piperazine and 2-methyl-1(2-aminobutyl)-piperazine. Higher homologs, obtained by condensing two or more of the above-illustrated alkylene amines, are also useful, as are the polyoxyalkylene polyamines (e.g., "Jeffamines").

The ethylene polyamines, examples of which are mentioned above, are especially useful for reasons of cost and effectiveness. Such polyamines are described in detail under the heading "Diamines and Higher Amines" in Kirk-Othmer, Encyclopedia of Chemical Technology, Second Edition, Vol. 7, pp. 22-39. They are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines. Because of their availability, these mixtures are particularly useful in preparing the nitrogen-bridged dispersant. Satisfactory products can also be obtained by the use of pure alkylene polyamines.

Hydroxy polyamines, e.g., alkylene polyamines having one or more hydroxyalkyl substituents which can be derived from the alkylene oxide on the nitrogen atoms, are also useful in preparing the nitrogen-bridged dispersant. Preferred hydroxyalkyl-substituted alkylene polyamines are those in which the hydroxyalkyl group has less than about 10 carbon atoms. Examples of such hydroxyalkyl-substituted polyamines include N-(2-hydroxyethyl)ethylene diamine, N,N'-bis(2-hydroxyethyl)-ethylene diamine, 1-(2-hydroxyethyl)piperazone, monohydroxypropyl-substituted diethylene triamine, dihydroxypropyltetraethylene pentamine and N-(3-hydroxybutyl)tetramethylene diamine. Higher homologs obtained by condensation of the above-illustrated hydroxyalkyl-substituted alkylene amines through amino radicals or through hydroxy radicals are likewise useful.

The source of the acyl radical in the carboxylic polyamine dispersant is an acylating agent comprising a carboxylic acid-producing compound containing a hydrocarbon or substituted hydrocarbon substituent which has at least about 40 and preferably at least about 50 carbon atoms. By "carboxylic acid-producing compound" is meant an acid, anhydride, acid halide, ester, amide, imide, amidine or the like; the acids and anhydrides are preferred.

The carboxylic acid-producing compound is usually prepared by the reaction (more fully described hereinafter) of a relatively low molecular weight carboxylic acid or derivative thereof with a hydrocarbon source containing at least about 40 and preferably at least about 50 carbon atoms. The hydrocarbon source is usually aliphatic and should be substantially saturated, i.e., at least about 95% of the total number of carbon-to-carbon covalent linkages should be saturated. It should also be substantially free from pendant groups containing more than about six aliphatic carbon atoms. It may be a substituted hydrogen source; by "substituted" is meant sources containing substituents which do not alter significantly their character or reactivity. Examples are halide, hydroxy, ether, keto, carboxy, ester (especially lower carbalkoxy), amide, nitro, cyano, sulfoxy and sulfone radicals. The substituents, if present, generally comprise no more than about 10% by weight of the hydrocarbon source.

The preferred hydrocarbon sources are those derived from substantially saturated petroleum fractions and olefin polymers, particularly polymers of monoolefins having from 2 to about 30 carbon atoms. Thus, the hydrocarbon source may be derived from a polymer of ethylene, propene, 1-butene, isobutene, 1-octene, 3-cyclohexyl-1-butene, 2-butene, 3-pentene or the like. Also useful are interpolymers of olefins such as those illustrated above with other polymerizable olefinic substances such as styrene, chloroprene, isoprene, p-methylstyrene, piperylene and the like. In general, these interpolymers should contain at least about 80%, preferably at least about 95%, on a weight basis of units derived from the aliphatic monoolefins.

Another suitable hydrocarbon source comprises saturated aliphatic hydrocarbons such as highly refined high molecular weight white oils or synthetic alkanes.

In may instances, the hydrocarbon source should contain an activating polar radical to facilitate its reaction with the low molecular weight acid-producing compounds. The preferred activating radicals are halogen atoms, especially chlorine, but other suitable radicals include sulfide, disulfide, nitro, mercaptan, ketone and aldehyde groups.

The olefin polymers having a number average molecular weight between about 600 and about 5000 (as determined by gel permeation chromatography) are preferred, although higher polymers having molecular weights from about 10,000 to about 100,000 or higher can be used. Especially suitable as hydrocarbon sources are isobutene polymers within the prescribed molecular weight range, and chlorinated derivatives thereof.

Any one of a number of known reactions may be employed for the preparation of the carboxylic acid-producing compounds. Thus, an alcohol of the desired molecular weight may be oxidized with potassium permanganate, nitric acid or a similar oxidizing agent; a halogenated olefin polymer may be reacted with a ketene; an ester of an active hydrogen-containing acid, such as acetoacetic acid, may be converted to its sodium derivative and the sodium derivative reacted with a halogenated high molecular weight hydrocarbon such as brominated wax or brominated polyisobutene; a high molecular weight olefin may be ozonized; a methyl ketone of the desired molecular weight may be oxidized by means of the haloform reaction; an organometallic derivative of a halogenated hydrocarbon may be reacted with carbon dioxide; a halogenated hydrocarbon or olefin polymer may be converted to a nitrile, which is subsequently hydrolyzed. Preferably an olefin polymer or its halogenated derivative may undergo a reaction with an unsaturated carboxylic acid or derivative thereof such as acrylic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, and the like, or with a halogen-substituted carboxylic acid or derivative thereof. This latter reaction is preferred, especially when the acid-producing compound is unsaturated and preferably when it is maleic acid or anhydride. The resulting product is then a hydrocarbon-substituted succinic acid or derivatives thereof. The reaction leading to its formation involves merely heating the two reactants at a temperature from about 100° to about 200° C. The substituted succinic acid or anhydride thus obtained, may, if desired, be converted to the corresponding acid halide by reaction with known halogenating agents such as phosphorus trichloride, phosphorus pentachloride or thionyl chloride.

For the formation of the carboxylic polyamine dispersant, the hydrocarbon-substituted sucinic anhydride or acid, or other carboxylic acid-producing compound, and the alkylene polyamine or other polyamine-containing reagent are heated to a temperature above about 80° C., preferably from about 100° to about 250° C. The product thus obtained has predominantly amide, imide and/or amidine linkages (containing acyl or acylamidoyl groups). The process may in some instances be carried out at a temperature below 80° C. to produce a product having predominantly salt linkages (containing acyloxy groups). The use of a diluent such as mineral oil, benzene, toluene, naphtha or the like is often desirable to facilitate control of the reaction temperature.

The relative proportions of the carboxylic acid-producing compound and the alkylene polyamine or the like are such that at least about one-half the stoichiometrically equivalent amount of polyamine is used for each equivalent of carboxylic acid-producing compounds. In this regard, it will be noted that the equivalent weight of the alkylene polyamine is based upon the number of amine radicals therein, and the equivalent weight of the carboxylic acid-producing compound is based on the number of acidic or potentially acidic radicals. (Thus, the equivalent weight of a hydrocarbon-substituted succinic acid or anhydride is one-half its molecular weight.) Although a minimum of one-half equivalent of polyamine per equivalent of acylating agent should be used, there does not appear to be an upper limit for the amount of polyamine. If an excess is used, it merely remains in the product unreacted without any apparent adverse effects. Ordinarily, about 1–2 equivalents of polyamine are used per equivalent of acylating agent.

The Mannich polyamine dispersants are those disclosed, for example, in the above-mentioned United States Pat. Nos. 3,316,972 and 3,544,420, which also describe convenient methods for their preparation. The source of the oil soluble group in the Mannich polyamine dispersant is an alkylated hydroxy aromatic compound comprising the reaction product of an olefinic polymer, an aromatic compound containing at least one hydroxy group. The alkyl substituted hydroxy aromatic compound is usually prepared by the alkylation of the hydroxy aromatic compound in well known procedures with an alkylation agent which would provide to the hydroxy aromatic substantial oil-solubility, which substituent is commonly derived from a polyolefin having at least about 40 carbon atoms. The hydrocarbon source is substantially aliphatic. However, it should contain at least one unsaturated group. The hydrocarbon source should also be substantially free from a quantity of pendant groups that would reduce oil solubility. Examples of acceptable groups are halide, hydroxy, ether, carboxy, ester, amide, nitro, cyano, etc. The substituents at present generally comprise no more than about 10 weight percent of the hydrocarbon source.

The preferred hydrocarbon sources are those derived from substantially saturated petroleum fractions and olefin polymers, preferably polymers of mono-olefins having from 2 to 30 carbon atoms. The hydrocarbon source may be derived from ethylene, propene, 1-butene, isobutene, 1-octene, 1-methyl-cyclohexene, 2-butene, 3-pentene, etc. Also useful are co-polymers of olefins described above with other polymerizable olefinic substances such as styrene, etc. In general these inert polymers should contain at least 80 percent preferably about 95 percent, of units derived from the aliphatic mono-olefins to preserve oil solubility.

The hydrocarbon source generally contains at least 40 and preferably 50 carbon atoms to provide substantial oil solubility to the dispersant. The olefin polymers having a number average molecular weight between about 300–5,000 are preferred for reasons of easy reactivity and low cost; however, higher polymers can be used. Especially suitable hydrocarbon sources are polyisobutylene polymers.

Commonly, the Mannich reaction is carried out by reacting the substituted hydroxy aromatic compound with an aldehyde and a polyamine. The Mannich polyamine can be treated with aliphatic acids, and boric acid compounds to improve processability and additive performance. Commonly, the substituted hydroxy aromatic compound is contacted with from about 0.1–10 moles of polyamine and 0.1–10 moles of aldehyde per mole of alkyl substituted hydroxy aromatic compound. The reactants are mixed and heated to a temperature of above about 80° C. to initiate the reaction. Preferably the reaction is carried out at a temperature from about 100° to about 250° C. The product thus obtained has predominantly benzylamine linkage between the aromatic compound and the polyamine. The reaction can be carried out in inert diluent such as mineral oil, benzene, toluene, naphtha, lingroin, or other inert solvents to facilitate control of viscosity, temperature, and reaction rate.

Any conventional formaldehyde yield reagent is useful for the preparation of Mannich polyamine dispersants. Examples of such formaldehyde yielding reagents are trioxane, paraformalde, trioxymethylene, aqueous formalin, gaseous formaldehyde, etc.

The polyamines useful for preparing the Mannich polyamine dispersants are the same as those useful for preparing the carboxylic polyamine dispersants described above.

In somewhat greater detail, the fluorocarbon passivated polyamine dispersants of this invention can be made by the reaction of the polyamine dispersant with an oxidizing agent or by preparing the polyamine dispersant from a polyamine which has been mildly oxidized with an oxidizing agent.

In either instance the polyamine or the polyamine dispersant having nitrogen to hydrogen bonds is oxidized to an extent to prevent deterioration of fluorocarbon compositions.

The oxidation of polyamine or polyamine dispersants can be performed by contacting the dispersant under oxidizing conditions with about 0.1 to 10.0 moles and greater of the oxidizing agent per mole of the dispersant. The reaction can be conducted neat or in a solvent that can be used to form the dispersant. The reaction mixture can be heated to a temperature of about ambient (27° C.) to 800° C. for a period of time of about 1 to 48 hours depending on the oxidizing agent used molar ratio and purity of reactants. To avoid substantial degradation strong oxidizing agents such as ozone, sulfur trioxide, peroxides, etc. require less strenuous oxidizing conditions and reduced amounts of oxidizing agent and can be added in a diluted form. Degrading and nondegrading oxidations are disclosed in U.S. Pat. Nos. 2,806,860; 2,982,728; 3,316,177; 3,153,025; 3,365,499; and 3,544,520. It is important to adjust reaction conditions using the oxidizing agent so that the polyamine moiety and the polyalkenyl substituent become degraded to the extent that the dispersant maintains substantial solubility and dispersancy. In this way the oxidizing agent can introduce oxygen containing polar functional groups and other molecular changes without substantial degradation.

The oxidation can be controlled to prevent degradation by continually measuring the TBN of the product as described in ASTM, D-664 or ASTM, D-2896. Generally about a 90% decrease, preferably a 50% decrease in TBN indicates a product with substantial dispersancy and is not destructive to fluorocarbon seals.

The preferred oxidizing agent is an oxygen containing gas such as air. Stronger oxidants are more difficult to control. Other oxidants produce sulfur, nitrogen etc. containing compounds which can be deleterious to the oxidized product properties in some instances. These oxidants produce useable compositions, but the compositions are somewhat less effective.

Oxidations of the polyamine dispersants by oxygen-containing gases can be carried out at a temperature of about 60° C. to 600° C. depending on the oxygen concentration and flow rate. Preferably, with air oxidation flow rates of 1–100 standard cubic feet per hour (SCFH) per mole of polyamine dispersant are used. The oxidation can be carried out at a temperature of about 60° to 300° C. with no substantial degradation depending on oxidizing agent and concentration.

The oxidation process apparently produces a variety of polyamine modifications including nitroso, nitrite, moieties etc., and hydrocarbon modifications including carbonyls, carboxyls, vicinyl hydroxyls etc.

The polyamine dispersant can be oxidized neat or preferably in a solution. Examples of useful solvents are polyalkenes, aliphatic solvents such as hexane, heptane, pentane, lingroin, petroleum ether, etc., aromatic solvents such as benzene, toluene, xylene, and $C_9+$ aromatic streams.

The air oxidations can be carried out at reduced, ambient, or elevated pressures in well-stirred glass, stainless steel or other oxidation resistant vessels. Reaction temperatures from about 60° C. to about 600° C. can be used. At temperatures used for the oxidation the reaction can be carried out in a period from about 1 to about 48 hours. Preferably with mild conditions 24 hour oxidation time is sufficient for complete oxidation.

There are many catalysts disclosed in the art for oxidation reactions. These conventional oxidation catalysts can be used to oxidize the compounds in this invention, but the catalysts may remain in the product and produce undesirable effects preferably the reaction is uncatalyzed.

EXAMPLE I

Into a 10-liter resin kettle equipped with a stirrer, heater, temperature control and air sparge was placed 4677 gms. of a Mannich polyamine dispersant prepared from a polyisobutylene substituted phenol, formaldehyde, tetraethylene pentamine and oleic acid. Into the Mannich dispersant, heated to 375° F. and stirred at 325 rpm was passed air at a rate of 1600 c.c. per minute. The product TBN and viscosity was monitored as a function of time.

| Hr. | TBN | 210° Vis. (CS) | (SUS) |
|---|---|---|---|
| 0.0 | 31.7 | 240.75 | 1124 |
| 1.0 | 31.69 | | |
| 2.0 | 27.72 | | |
| 3.0 | 26.5 | | |
| 4.0 | 24.42 | | |
| 5.0 | 21.29 | 318.89 | 1488 |
| 6.0 | 20.97 | | |

-continued

| Hr. | TBN | 210° Vis. (CS) | (SUS) |
|---|---|---|---|
| 7.0 | 20.18 | | |
| 8.0 | 19.14 | 384.67 | 1795 |
| 9.0 | 19.10 | | |
| 9.5 | 17.34 | | |

EXAMPLE II

Into a 3-liter three-neck flask equipped with a stirrer, heater, and air sparge was added 200 gms. of a commercially available succinimide polyamine dispersant (having a TBN=53.76) which was believed to be prepared from a polyisobutene substituted succinic anhydride, having a molecular weight about 650, and tetraethylene pentamine. Into the stirred polyamine dispersant at a temperature of 375° F., was sparged air at a rate of 2000 ml/min. for 2 hrs. At the end of two hours of air addition the TBN was 17.72.

TABLE I

| Test or Components | | |
|---|---|---|
| Zinc dialkyl dithiophosphate | 1.25 | 1.25 |
| Calcium phenate | 0.50 | 0.50 |
| Magnesium sulfonate | 0.90 | 0.90 |
| Sulfurized alpha olefin | 0.58 | 0.58 |
| Calcium sulfonate | 1.00 | 1.00 |
| Anti-Foam | 0.30 | 0.30 |
| Base oil | 23.00 | 23.00 |
| Polyamine Mannich | 5.0 | — |
| Product of Ex. I | — | 5.00 |
| ASTM D-471 | | |
| Viton Seal Test (% Elongation, | −54, | −7, (Target |
| Tensile Strength Loss %) | −58 | −7 less than −30, |
| VD Test | | (Target) |
| Average Sludge | 9.50 | 9.43 9.4 |
| Average Varnish | 7.70 | 6.86 6.6 |
| Piston Varnish | 7.31 | 6.71 6.7 |

We claim:

1. A process for improving the compatibility of a polyamine dispersant with fluorocarbon compositions which comprises reacting said dispersant with an oxidizing agent which is selected from the group consisting of oxygen, sulfur oxides, nitrogen oxides, peroxides and ozone, wherein the amount of said oxidizing agent is effective to reduce the TBN of said dispersant by about 50% to about 90%.

2. The process as set forth in claim 1 wherein said dispersant comprises the reaction product of a polyolefin substituted succinic anhydride and a polyamine.

3. The process as set forth in claim 1 wherein said dispersant comprises the Mannich reaction product of a polyolefin substituted phenol, formaldehyde and a polyamine.

4. The process as set forth in claim 1 wherein said oxidizing agent comprises oxygen.

5. The process as set forth in claim 7 wherein said oxidizing agent comprises air.

6. The process as set forth in claim 1 wherein the dispersant is contacted with about 0.1 to 10.0 moles of said oxidizing agent per mole of dispersant.

7. The process as set forth in claim 1 wherein said reaction is carried out in the presence of an oxidation catalyst.

8. A process for improving the compatibility of a polyamine dispersant with fluorocarbon compositions which comprises reacting said dispersant with an oxidizing agent at a temperature from about 60° to 300° C., wherein said oxidizing agent comprises oxygen and the amount of said oxidizing agent is effective to reduce the TBN of said dispersant by about 50% to about 90%.

9. The process as set forth in claim 8 wherein said oxidizing agent comprises air.

10. The product prepared by the process of claim 1, 2, 3, 4, 5, 6, 7, 8 or 9.

11. A lubricant comprising a major portion of a lubricating base oil and an effective dispersancy providing amount of the product of claim 10.

* * * * *

UNITED STATES PATENT OFFICE
CERTIFICATE OF CORRECTION

Patent No. 4,379,064    Dated April 5, 1983

Inventor(s) John A. Cengel, Mack W. Hunt, Joseph S. Strukl and Peter G. Pappas

It is certified that error appears in the above-identified patent and that said Letters Patent are hereby corrected as shown below:

In the tabulation of inventors on the cover sheet, "Mark W. Hunt" should read --Mack W. Hunt--.

Column 1, line 6, "concentrates, thereof" should read --concentrates thereof--.

Column 1, line 38, "primarily" should read --primary--.

Column 5, line 56, "hydrogen" should read --hydrocarbon--.

Column 8, line 31, "paraformalde" should read --paraformaldehyde--.

Signed and Sealed this

Fourteenth Day of February 1984

[SEAL]

Attest:

GERALD J. MOSSINGHOFF

Attesting Officer    Commissioner of Patents and Trademarks